United States Patent [19]

Villa

[11] 4,136,534

[45] Jan. 30, 1979

[54] KNITTING MACHINE

[76] Inventor: Carlo Villa, Via Mazzini 43 - Melzo, Milan, Italy

[21] Appl. No.: 795,944

[22] Filed: May 11, 1977

[30] Foreign Application Priority Data

May 19, 1976 [IT] Italy .................. 23379 A/76

[51] Int. Cl.² .............................................. D04B 23/00
[52] U.S. Cl. ..................................... 66/84 A; 66/207
[58] Field of Search ................. 66/84 R, 84 A, 85 R, 66/126, 128, 129, 149, 207

[56] References Cited

U.S. PATENT DOCUMENTS

| | | | |
|---|---|---|---|
| 2,892,331 | 6/1959 | Kelly | 66/85 R |
| 3,099,920 | 8/1963 | Liebrandt et al. | 66/207 |
| 3,523,430 | 8/1970 | Inui | 66/84 A |
| 3,552,151 | 1/1971 | Schuler et al. | 66/84 A |
| 3,745,792 | 7/1973 | Bergmann | 66/84 A |
| 3,987,648 | 10/1976 | Fillmore et al. | 66/207 |
| 4,034,579 | 7/1977 | Tillon | 66/85 R |

*Primary Examiner*—Henry Jaudon
*Attorney, Agent, or Firm*—Michael J. Striker

[57] ABSTRACT

A knitting machine has a weft thread laying unit for laying weft threads for linking with warp threads by means of needles, comprising a guide bar extending across the machine, and a slider slidable along the bar, the slider having a weft thread guide to lay a weft thread in front of the row of needles. The unit may have at least one pair of oppositely movable sliders to reduce inertia force in the unit.

1 Claim, 2 Drawing Figures

KNITTING MACHINE

BACKGROUND OF THE INVENTION

A knitting machine is known, comprising a row of hooked needles which are each disposed parallel to each other and which are arranged so as to be reciprocable in their axial direction. By virtue of such reciprocating movement, each needle forms a loop chain in a respective warp thread which is suitably guided to the respective needle. The simultaneously formed loops in the warp thread link with a common weft thread or two common weft threads, which were previously laid adjacent to the hooks of the row of needles. Repetition of the operating cycle comprising laying the weft thread or threads, and forming the loops in the warp threads and linking same with the weft thread or threads, makes is possible to weave a fabric in a predetermined pattern.

In a known knitting machine of this kind, the weft thread is laid by means of a weft thread guide which is carried by a transversely extending carrier bar. The bar is reciprocated in its axial direction, that is to say, transversely of the machine, but this reciprocating movement is generally of only limited extent for example one or two centimeters, so that this loom can be used to produce only very narrow ribbons or bands. Although this disadvantage of limited operating movement can be overcome by weaving a plurality of ribbons or bands parallel to each other, with the respective weft threads being laid by a large number of weft thread guides which are reciprocated simultaneously by the carrier bar, this results in a cumbersome piece of machinery which suffers from a slow speed of operation, and this impedes effective use of the machine.

On the other hand, increasing the length of the reciprocating travel of the carrier bar is not generally possible, firstly because this would further reduce the speed of operation of the knitting machine because of the inertia of the bar, and also because such an extended bar could be a danger to an operator operating the machine insofar as a substantial length of bar would project out of the machine in the limit position of the bar.

SUMMARY OF THE INVENTION

An object of the present invention is to provide a knitting machine which overcomes the above-described disadvantages and which can be used for weaving relatively wide fabrics, such as fabrics for producing body belts or corsets.

A further object of the invention is to provide a knitting machine capable of weaving a relatively wide fabric, at a relatively high speed and without being of excessive and possibly dangerous size.

According to the invention, these and other objects are achieved in that the knitting machine includes a weft thread laying unit which comprises at least one fixed bar which extends parallel to the row of needles. The bar carries at least one slider which is axially movable along the bar, the slider carrying a weft thread guide. The unit includes drive means for reciprocating the slider along the bar, and the slider and the weft thread guide are so arranged that, as the slider slides along the bar, a respective weft thread is laid over the warp threads and immediately below the plane defined by the row of needles. Weft threads may be associated with some or all of the row of needles.

With this arrangement, the length of the travel of the slider depends on the associated drive means, so that it is possible for the length of travel of the slider to be adjusted as required, by suitable adjustment of the slide drive means, thereby to weave fabrics of different widths.

The unit may comprise a pair of fixed bars, the pair of bars carrying two or possibly more sliders which are interconnected by a connecting rod so that the sliders are driven with a sliding motion along the bars, as a joint unit.

If two weft threads are to be laid simultaneously, the laying unit has two parallel fixed bars, or two pairs of such bars, each bar or pair of bars carrying a respective slider or sliders. Each said slider or sliders on each said bar or pair of bars is connected to a respective drive means, so arranged that the sliders on the respective bars or pair of bars are displaced in phase opposition to each other, that is to say, one slider or set of sliders operates in one direction while the other slider or sliders operate in the other direction, thus providing for compensation for the inertia of the respective sliders.

DESCRIPTION OF THE PREFERRED EMBODIMENT

Figure 1:
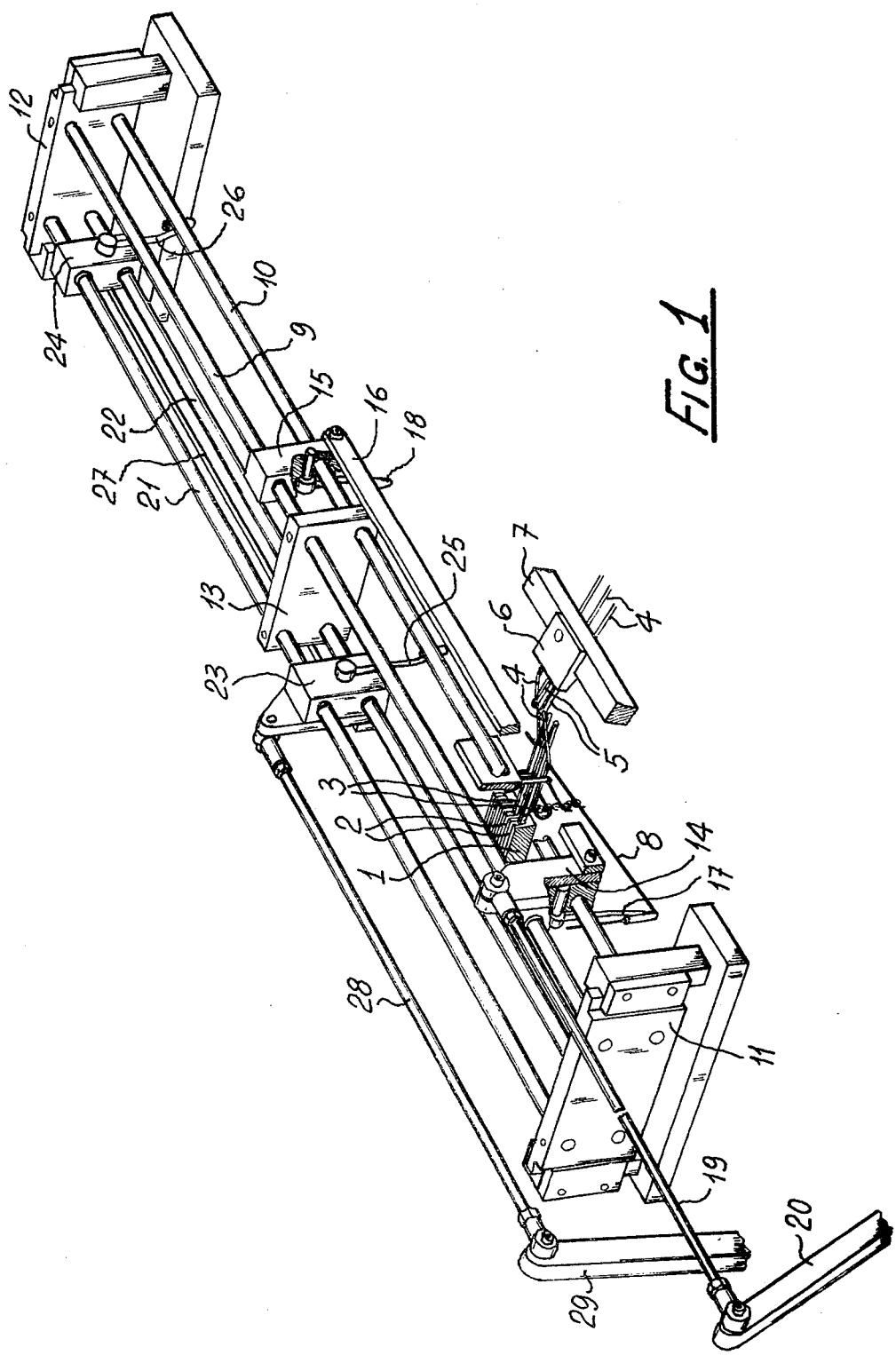
FIG. 1 shows a diagrammatic perspective view of a knitting machine including a weft thread laying unit.

Referring now to FIG. 1, a knitting machine includes an elongate fixed support member 1 which extends transversely of the machine, i.e. in the weft direction, and which is of a length such as to bridge the distance between two side support plates 11 and 12. The upwardly directed face of the support member 1 has a plurality of mutually parallel grooves or tricks 2 which extend completely across the support member 1. Each groove 2 provides for the seating and guiding of a respective hook needle 3. It will be appreciated that, as mentioned above, the support member 1 extends completely between the side plates 11 and 12, although only a part of its length is illustrated in the drawing for the sake of simplicity, and parallel grooves 2 are provided along the entire length of the support member. At least a portion of the support member 1, along which a weaving operation is to be effected, will have needles 3 in the respective grooves 2.

The loom further includes a reciprocating drive assembly (not shown) which is disposed behind the support member 1 and which is operatively connected to the needles 3, whereby the needles 3 are reciprocable in their grooves 2 between an advanced position in which the or each advanced needle is operable to engage a respective warp thread 4, and a retracted position in which the or each retracted needle 3 is completely retracted into the respective groove 2, with the result that the open front end of the groove 2 constitutes a shoulder for removing a previously formed warp thread loop from the retracted needle 3.

The warp threads 4 are fed to the needles by a thread feeder (not shown), and the number of warp threads 4 fed by the feeder is equal to the number of operative needles 3 for weaving purposes. The warp threads 4 are so disposed that each operative needle 3 may grasp and form a loop in the respective warp thread. The loom has a respective thread guide 5 for each warp thread being fed, all the thread guides 5 extending parallel to each other and forming a reed or comb 6 carried by a movable transverse member 7. The movable transverse member 7 is moved in a periodic circular motion in timed relation to the reciprocating movement of the needles 3 in their respective grooves 2, so that each thread guide 5 draws its respective warp thread 4 around the respective advanced needle 3 so that the needle 3 may engage the warp thread and thereby form the loop.

At the beginning of each operating cycle, when the needles 3 are still in their retracted position within the grooves 2, one or two weft threads 8 are laid in a path extending over the row of warp threads 4 but below the plane of the needles 3, adjacent to the needles when in their retracted condition. In this manner the weft threads are linked with the loops formed by the actuating motion of the thread guides 5 and the needles 3, and contribute to the weaving of the fabric, for, without the weft threads being laid in this manner, the needles 3 would produce loop chains which were parallel to and independent of each other.

The loom of FIG. 1 also includes a weft thread laying unit which can provide for the laying of weft threads over a substantial length, as will now be described.

The weft thread laying unit comprises at least one guide bar, there being a pair of parallel guide bars 9 and 10 in the illustrated embodiment, the bar 9 being arranged vertically above the bar 10. The bars 9 and 10 extend transversely of the machine, that is to say, parallel to the support member 1, and thus also parallel to the direction of laying of the weft thread or threads 8. The bars 9 and 10 are fixed at least in their axial direction, being connected to the side members 11 and 12.

At their centre, the bars 9 and 10 are each engaged with a vertical plate 13 which is secured to a fixed part of the frame structure of the loom and which divides each of the bars 9 and 10 into two portions of equal length. The plate 13 also stiffens the bars 9 and 10 to resist flexing thereof, as in a vertical or horizontal direction perpendicular to their axes, by holding the bars 9 and 10 at their centre as just mentioned.

A respective slider 14 and 15 is carried on the bars 9 and 10, on each of the two equal-length portions defined by the plate 13. Each slider 14 and 15 has the bars 9 and 10 extending through it whereby the slider is movable axially along the bars, without substantial clearance relative thereto. The sliders 14 and 15 are interconnected by a connecting rod 16 so that their sliding movement along the respective bar portions is synchronised, insofar as the spacing between the sliders remains unaltered during their sliding movement.

Because the sliders 14 and 15 are mounted slidably along two parallel bars 9 and 10 disposed one above the other, the sliders cannot be displaced or rotated in a direction perpendicular to the axes of the bars 9 and 10, thereby ensuring that the weft threads laid by operation of the sliders, as will be described hereinafter, extend precisely along a predetermined desired path, without substantial transverse deviation therefrom.

Each of the sliders 14 and 15 has a respective weft thread guide 17 and 18 which are each so positioned that the weft threads guided by the guide 17 and 18 are laid in front of respective portions of the support member 1, below the plane of the advancing needles 3, but above the warp threads 4 when the needles 3 are in their retracted positions in the grooves 2.

The weft thread laying unit further includes a pivotal drive arm 20 which is connected by a connecting rod 19 to the slider 14. The arm 20 is driven with a reciprocating angular or pivotal movement, of a magnitude such that the sliders 14 and 15 are slid along the bars 9 and 10 over the necessary predetermined distance, in order thereby to cover the full width of the fabric which is to be woven.

Where two parallel weft threads are to be simultaneously laid and linked with the warp thread loops formed by actuation of the needles 3, the weft thread laying unit includes a further pair of parallel bars 21 and 22 of which the bar 21 is positioned above the bar 22. The bars 21 and 22 are also disposed parallel to the bars 9 and 10, being secured to the side plates 11 and 12 and stiffened by the centre plate 13. The bars 21 and 22 further carry sliders 23 and 24 which are rigidly interconnected by a connecting rod 27. The sliders 23 and 24 carry respective weft thread guides 25 and 26 for laying their weft threads. The sliders 23, 14 and 24, 15 will thus lay weft threads in front of respective common portions of the row of needles. The sliders 23 and 24 are oriented in the opposite direction relative to the sliders 14 and 15, that is to say, when the sliders 14 and 15 are in their position in which the slider 14 is adjacent to the slide plate 11 and the slider 15 is adjacent to the centre plate 13, the sliders 24 and 23 are in positions in which they are adjacent to the side plate 12 and the centre plate 13 respectively, substantially as shown in FIG. 1. The sliders 23 and 24 are reciprocated along the carrier bars 21 and 22 in opposite phase relative to the sliders 14 and 15, so that even if the two weft threads are to be laid simultaneously in front of the support member 1, the sliders 14 and 15 lay their weft thread in one direction and the sliders 23 and 24 lay their weft thread in the opposite direction. Because the sliders 14, 15 and 23, 24 move in mutally opposite directions, they provide compensation or counterbalancing for the inertia forces generated by the sliders.

The weft thread laying unit further includes a second pivotal drive arm 29 which is connected to the slider 23 by a connecting rod 28. The arm 29 is pivoted over the same angular distance as the arm 20 but in phase opposition thereto, to produce the oppositely directed movement of the sliders, as described above.

Figure 2:
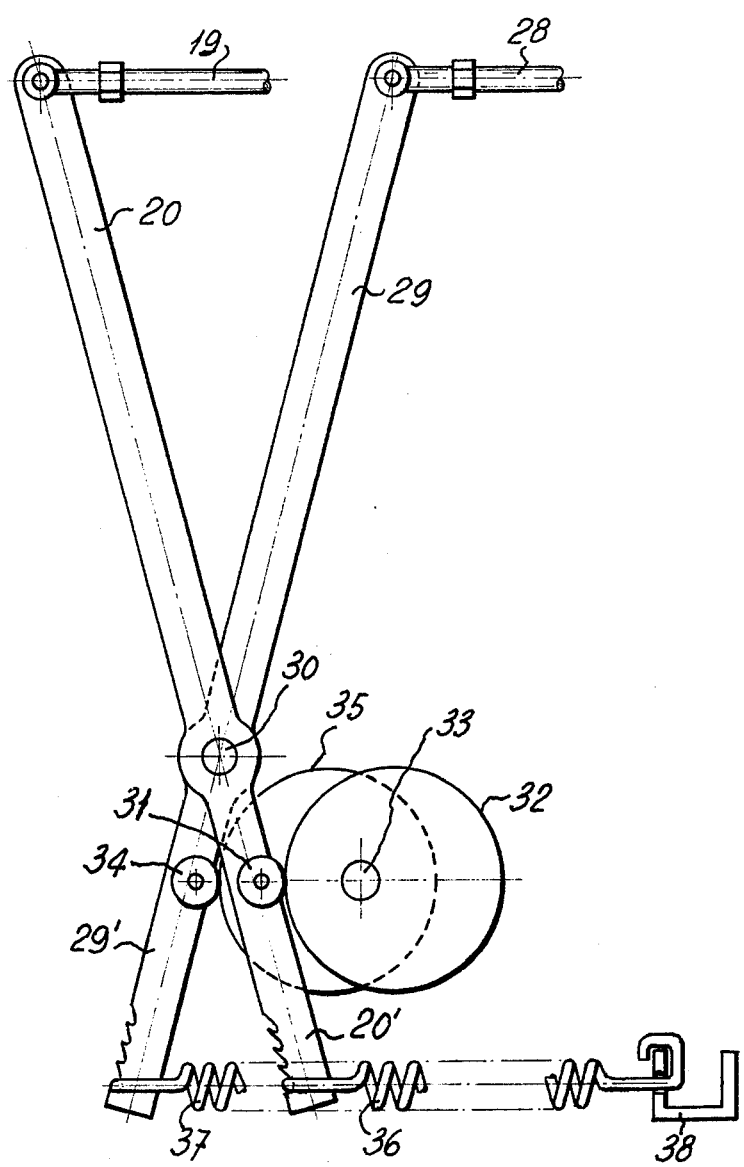
FIG. 2 shows an embodiment of a reciprocating drive means for the sliders of the FIG. 1.

As shown in FIG. 2, the two arms 20 and 29 are pivoted on a common pivot 30, and each arm 20 and 29 is extended beyond the pivot 30 in a direction away from the respective connecting rods 19 and 28, to provide portions 20' and 29' respectively. The portion 20' is provided with a follower 31 such as a roller co-operating with a cam 32 which as illustrated is in the form for example of an eccentric cam disc rotating about a spindle 33, the eccentricity of the cam 32 being such as to produce the predetermined reciprocating movement of the connecting rod 19.

The lever portion 29' carries a similar follower 34 such as a roller co-operating with a rotatable cam disc 35 which rotates about the same spindle 33, but it will be seen from FIG. 2 that the two cams 32 and 35 are in phase opposition to each other, thereby to provide the oppositely directed movements of the respective pairs of sliders 14, 15 and 23, 24.

Springs 36 and 37 are connected between the free ends of the respective portions 20' and 29' and a fixed anchoring member 38 formed by a fixed part of the knitting machine frame structure. The springs 36 and 37 are arranged to hold the respective followers 31 and 34 in engagement with their cams 32 and 35. The position of engagement of the ends of the spring 36 and 37 with the respective portions 20' and 29' is adjustable by virtue of a series of notches or indentations as shown on those portions 20' and 29'.

It will be appreciated however that the sliders 14, 15 and 23, 24 may be caused to slide along their respective bars 9, 10 and 21, 22 by drive means different from those shown in FIG. 2.

The above-described weft thread laying unit makes it possible to lay weft threads over a substantial length, without the generation of substantial inertia forces, whereby the machine can operate at high speed and can weave relatively wide fabric, for example over the entire loom width, or alternatively the machine can be used to weave for example two fabric portions each extending over half the loom width. The knitting machine is particularly suitable for use in weaving body belts or corsets.

Various modifications may be made without thereby departing from the scope of the present invention as defined by the appended claims.

I claim:

1. In a knitting machine comprising a plurality of mutally parallel hook needles which are mounted displaceably between an advanced position and a retracted position, the needles being operable to form in respective warp threads a loop chain and thereby linking with each resulting row of loops at least one weft thread which is laid over the warp threads when the needles are in their retracted position; a weft thread laying unit comprising fixed guide bar means extending transversely of the loop parallel to the direction of laying of the weft thread, said bar means including two pairs of mutually parallel bars, the two pairs being parallel to each other and one bar of each pair being arranged above the other bar of said pair; slider means mounted for reciprocating sliding movement along said bar means and including at least one respective slider mounted on each of said pair of bars for reciprocating sliding motion therealong; drive means operable to produce the reciprocating sliding movement of the slider means and to displace the respective sliders on the respective pairs of bars in phase opposition relative to each other and including for each said slider a drive arm which is mounted for reciprocating angular movement about a pivot; means for producing the pivotal movement of the arms whereby the two arms are pivoted through an equal angular distance and in phase opposition relative to each other; and a weft thread guide carried by said slider means and operable to lay a weft thread guided thereby along a path extending over said warp threads and adjacent to the needles when the same are in their retracted position.

* * * * *